United States Patent [19]

Bodlaj

[11] 3,954,335
[45] May 4, 1976

[54] METHOD AND APPARATUS FOR MEASURING RANGE AND SPEED OF AN OBJECT RELATIVE TO A DATUM PLANE

[75] Inventor: Viktor Bodlaj, Munich, Germany

[73] Assignee: Siemens AG, Berlin & Munich, Germany

[22] Filed: June 6, 1973

[21] Appl. No.: 367,414

[30] Foreign Application Priority Data
June 19, 1972  Germany............................ 2229887

[52] U.S. Cl. .......................................... 356/4; 356/1; 356/5; 350/6
[51] Int. Cl.² ............................................. G01C 3/08
[58] Field of Search ....................... 356/1, 4, 5, 28; 350/285, 6; 328/127, 133, 34

[56] References Cited
UNITED STATES PATENTS

| | | | |
|---|---|---|---|
| 3,442,570 | 5/1969 | Picker................................. | 350/285 |
| 3,554,646 | 1/1971 | Carlson................................. | 356/4 |
| 3,666,367 | 5/1972 | Farnsworth et al..................... | 356/5 |
| 3,692,414 | 9/1972 | Hostermann et al. ................... | 356/4 |
| 3,698,811 | 10/1972 | Weil..................................... | 356/28 |
| 3,758,199 | 9/1973 | Thaxter................................. | 350/6 |
| 3,759,614 | 9/1973 | Harvey................................. | 356/1 |

FOREIGN PATENTS OR APPLICATIONS

703,189   1/1954   United Kingdom................ 328/133

Primary Examiner—Maynard R. Wilbur
Assistant Examiner—S. C. Buczinski
Attorney, Agent, or Firm—Hill, Gross, Simpson, Van Santen, Steadman, Chiara & Simpson

[57] ABSTRACT

A ranging and velocity measuring system in which a laser beam is periodically deflected through an angular scan by a reference periodic wave and energy reflected from an object is detected and compared with the reference wave to determine range to the object. By measuring the range to the object at two different times, the velocity of the object toward or away from the detector can be determined.

15 Claims, 10 Drawing Figures

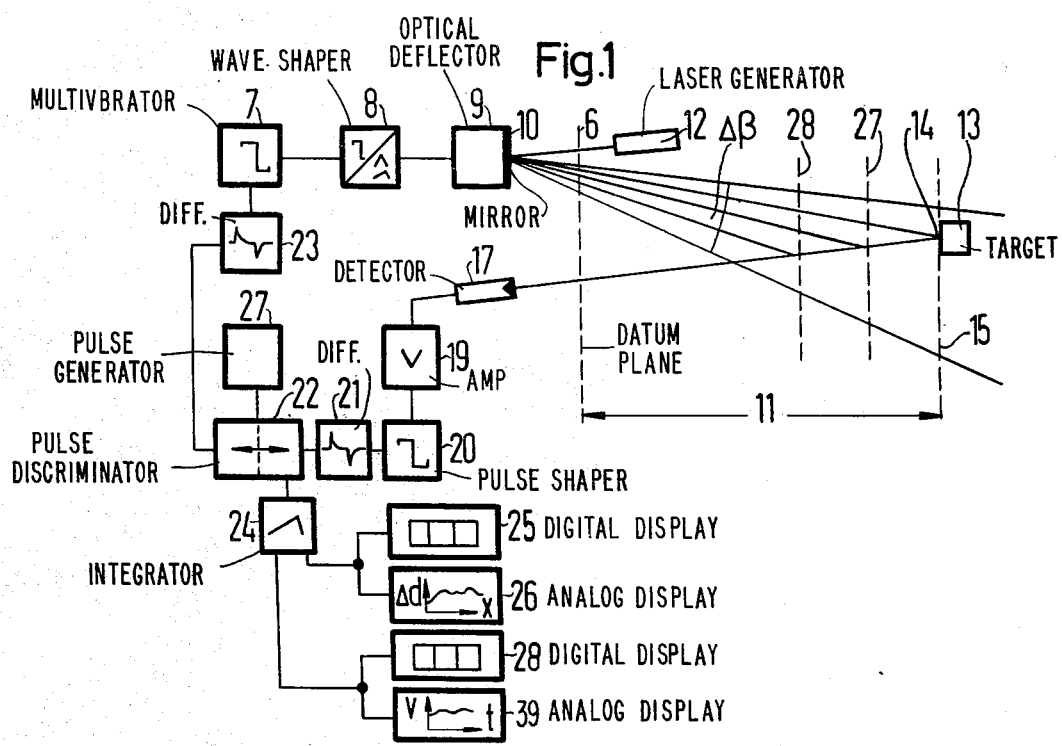

METHOD AND APPARATUS FOR MEASURING RANGE AND SPEED OF AN OBJECT RELATIVE TO A DATUM PLANE

BACKGROUND OF THE INVENTION

This invention relates in general to a range and velocity measuring apparatus and method and in particular to a beamed deflection system.

DESCRIPTION OF THE PRIOR ART

Range measuring systems in which a laser beam is scanned through space until a target object is encountered and in which the range of the target is determined by comparing the transit time of the beam to and from the target are well known.

In German Patent No. 1,798,215, a system is disclosed in which a picture tube mounted in a display unit which has an electronic beam which is displaced on the picture screen with the same vertical deflection frequency at which the transmitted laser beam moves through space is disclosed. The range of the object is determined by adjusting a phase delay device. This adjustment is a manual one and takes a relatively long time to accomplish.

In German Patent 2,112,325, an optical device for the simultaneous measurement of the range of a moving object and its velocity relative to a fixed point is described. The range of the object is determined by measurement of the delay of a laser beam pulse transmitted in a fixed direction and the speed of the object is measured by the frequency shift in the transmitted beam after reflection from the moving object. The main drawback of this system, however, resides in the fact that it must be very accurately aligned with the object upon which the measurement is to be made and high speed spacial scanning so as to locate the object is not possible with such system.

SUMMARY OF THE INVENTION

It is an object of the present invention to provide a method for measuring the range and velocity of an object relative to a datum plane which eliminates the drawbacks of the prior art.

In the present invention, a beam produced by a laser transmitter is periodically deflected through space in which the object is located and is diffusely reflected by the object and such reflections are detected by the detector mounted near the transmitter. The detector is selected so that it can only receive energy from a specific direction and range is determined from the time differential between the commencement of the beam deflection and the time of arrival of the detected signal. To deflect the beam, a beam deflector such as piezoelectric beam deflector using an oscillating mirror may be used.

The beam deflector may be driven by a triangular or sawtooth waveform voltage. At the start of the triangular or sawtooth waveform voltage, a reference pulse is generated and the time interval between this reference pulse and a pulse produced by the detector from the wave front of the reflected pulse is measured to obtain a time difference. This time difference is indicative of the range of the object from the transmitter and detector.

The triangular or sawtooth waveform voltage may be generated by integrating a square wave pulse and the reference pulse may be produced by differentiating the square wave pulse and selecting the positive going pulse coinciding with the start of the positive half-cycle of the square wave. The negative going pulse obtained by differentiating the square wave is suppressed.

The metering pulse is also differentiated and the positive going pulse is selected and supplied to a pulse discriminator with the reference pulse which produces a display pulse having a length proportional to the time difference between the reference and the metering pulse, and this time difference is indicative of the range of the object.

By measuring the range of the moving object at two different times, the velocity of the object perpendicular to the datum plane can be determined. To accomplish this, a pulse generator controls the pulse discriminator to connect it at the two times of measurement for the duration of half a deflection period of the beam deflector.

The range and speed components of the object perpendicular to the datum plane may be displayed upon digital and/or analog display units.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

BRIEF DESCRIPTION OF THE DRAWINGS

FIG. 1 is a block diagram illustrating the range and velocity measuring system of the invention; and FIGS. 2A through I illustrate wave shapes used in the invention.

DESCRIPTION OF THE PREFERRED EMBODIMENTS

FIG. 1 illustrates in block form the apparatus for measuring range and velocity according to the invention.

A laser generator 12 produces a beam which is directed so that it impinges upon a mirror 10 controlled by an optical deflector 9. The beam is deflected by the mirror 10 through a relatively narrow angle $\beta$ which might for example be 20°. If the beam intercepts a target 13 located at a range 11 from the datum plane 6 at the measuring station, it will be reflected to detector 17.

The deflection of the laser beam by the mirror 10 is controlled by the piezoelectric optical deflector 9 which includes the mirror 10. A multivibrator 7 generates a square wave voltage output which is supplied to a wave shaper 8. The wave shaper 8 may produce either triangular or sawtooth waveform voltages which are supplied to the piezoelectric optical deflector 9.

The laser 12 might be a continuous rated laser and the mirror 10 may oscillate at a frequency of several thousand cycles per second such that the laser beam will sweep through the angle $\beta$ several thousand times a second. If the mirror 10 is driven by a triangular waveform voltage, the laser beam will sweep linearly in both directions between its upper and lower angular limits relative to FIG. 1. If on the other hand, the mirror 10 is driven by a sawtooth shaped voltage, the motion in one direction between the upper and lower limits will be faster than in the other direction.

The time in the sweep cycle at which energy is reflected from an object 13 into the detector 17 indicates the range or distance of the object 13 from a datum plane 6. The light energy received by the detector 17 is converted into an electrical signal and is supplied to an amplifier 19 which amplifies it. The amplifier 19 may have an automatic gain control for example. A pulse shaper 20 receives the output of the amplifier 19 and forms a square wave shape voltage from the signal. A differentiator 21 receives the square wave voltage from the pulse shaper 20 and produces positive pulses coincidence with the rising positive half-cycles of the square wave voltage. The negative going pulses derived from the trailing edge of the square wave pulses are removed from the output of the differentiator 21 as for example, by clipping or in any suitable well known manner.

A pulse discriminator 22 receives the positive going pulses from the differentiator 21 which pulses are indicative of the time when reflected signals were received from the object 13.

The output of the generator 7 is supplied to a differentiator 23 which produces positive and negative pulses coincidence with the leading and trailing edges of the square wave from the generator 7 and eliminates the negative going pulses by filtering or any suitable well known manner. The positive going pulses from the differentiator 23 correspond with the leading edges of the square wave pulses produced by the generator 7 which are supplied to the pulse discriminator 22.

The pulse discriminator 22 produces output pulses which have variable lengths with the lengths corresponding to the time difference between the reference pulse from differentiator 23 and the metering pulses produced by the differentiator 21.

An integrator 24 receives the output of the pulses discriminator 22 and integrates it. A digital display unit 25 is connected to the output of the integrator. An analog display unit 26 is also connected to the output of the integrator 24. These display units may be calibrated to correctly indicate the range or distance of the object 13 from the reference data plane 6.

In operation, assume that the piezoelectric optical deflector 9 controls the mirror 10 such that a time of $T_0$ illustrated by the pulses $U_R$ in FIG. 2B, the laser beam coincides with its upper angular limit relative to FIG. 1 and that it is deflected by a control voltage $U_S$ as illustrated in FIG. 2C. The control voltage may be a sawtooth waveform 29 or a triangular shaped waveform 30.

As the distance of an object 13 varies from the datum plane 6, the time that the reflected pulse will be received at the detector 17 differs. For example, for three particular control voltages $U_{SS1}$, $U_{SS2}$, $U_{SS3}$ illustrated in FIG. 2C will produce three different metering pulses corresponding to those voltages which the control voltage was at when the object 13 was detected and the time that the metering pulse $U_M$ is produced.

From the metering pulses $U_{M31}$, $U_{M32}$, and $U_{M33}$ square wave pulses $U_{RM31}$, $U_{RM32}$ and $U_{RM33}$ illustrated in FIGS. 2I, 2G and 2E are produced. These pulses have different lengths and are indicative of the range of the object 13.

In the examples illustrated in FIGS. 2C through 2I, the triangular shaped pulse 30 is utilized, but it is to realized, of course, that the sawtooth shaped pulse 29 may also be utilized as a control voltage, and it will produce longer pulse lengths at the output of the integrator 24, thus allowing small differences in range of the object to be more accurately recorded.

It is also to be realized that if the object is relatively thick that the range to its near and far side surfaces can be measured and the thickness of the object can be determined by noting the range to these two surfaces.

In order to measure the velocity of the object relative to the datum plane 6, it can be assumed that the object 13 is moving at right angles toward the datum plane. Then, if its range is measured at two different times $t_1$ and $t_2$ which follow each other, then the change in range during the known time interval between the measurements will give the normal velocity relative to the datum plane 6. For this purpose, a pulse generator 27 is connected to the pulse discriminator 22 to switch it at a rate equivalent to half the duration of a deflection period of the oscillating mirror 10. A switch in the integrator 24 connects the display units 25 and 26 to the pulse discriminator 22 at the time $t_1$ so that the range of the object 13 is indicated at the time $t_1$. The integrator 24 also produces an output which is supplied to additional display units 28 which may be a digital unit and 39 which may be an analog unit. In the display units 28 and 39, display velocity which is determined by noting the change in range of the object between the times $t_1$ and $t_2$ and dividing such change in range by the time interval $t_2$ minus $t_1$ is indicated.

The method and apparatus for measuring the range and speed of objects can be utilized for example, in automobile traffic monitoring systems to monitor the range in the speed of the vehicles. A camera, not shown, may also be controlled by the output of the device which is automatically triggered by the first range metering pulse at the time $t_1$ so as to simultaneously photograph a monitored vehicle if desired.

It is seen that this invention provides a range and speed measuring device utilizing a laser beam which is swept through an angle by a sawtooth or triangular shaped waveform and which is reflected by an object to a detector and wherein the time the detected signal is received relative to the initiation of the sweep control pulse is indicative of range to the object.

By obtaining the range at two closely spaced time intervals $t_1$ and $t_2$ and dividing the range change by the time interval will produce velocity of the object in a direction normal to the datum plane.

Although the invention has been described with respect to preferred embodiments, it is not to be so limited as changes and modifications may be made which are within the full intended scope as defined by the appended claims.

I claim as my invention:

1. Method of rapidly measuring the range of an object from a datum plane and its speed component perpendicular to the datum plane comprising transmitting a laser beam, periodically deflecting said laser beam through the space in which the object is located by a piezoelectric beam deflector having an oscillatory mirror, diffusely reflecting said laser beam by the object, detecting said reflected laser beam by a detector mounted near the transmitter whereby said detector is capable of receiving light from only a specific direction, determining the range to said object from the time difference between the commencement of beam deflection and the time said detector receives said reflected signal, driving said piezoelectric beam deflector by a triangular or sawtooth voltage derived from a square wave generator, differentiating the output of said square wave generator and passing only the positive going pulses to represent the commencement of said beam deflection.

2. The method according to claim 1, comprising generating at the starting time of the triangular or sawtooth waveform voltage a reference pulse and measuring the time interval between said reference pulse and a metering pulse generated by the detector at the time the reflected signal is received to indicate the range of the object.

3. The method of claim 2, comprising generating the triangular or sawtooth waveform voltage by integration of a square wave signal; and generating the reference pulse by differentiating the square wave pulse and by suppressing negative going pulses.

4. The method of claim 2, comprising forming the metering pulse by differentiating a square wave and by suppressing the negative pulse and applying the metering and reference pulses to a pulse discriminator.

5. The method according to claim 4, comprising producing from said pulse discriminator a display pulse which has a length proportional to the time difference between the reference pulse and the metering pulse.

6. The method according to claim 5, converting the length of the display pulse to range by a digital pulse length indicator.

7. The method according to claim 5, comprising integrating said display pulse and indicating the integrated signal in analog and/or digital manner.

8. The method of claim 6 comprising determining the velocity component of the object normal to the datum plane by measuring the range at two different times in relation to a known time interval.

9. The method of claim 8, comprising switching said pulse discriminator by a pulse generator at the two instants of measurement for the duration of half a deflection period of the beam deflector.

10. The method of claim 9, comprising determining by means of a digital and/or analog speed indicator from the two instances of measurement.

11. Apparatus for measuring range to an object comprising, means for scanning a laser beam through a known angle, means for detecting a reflected signal from said object along a fixed line of sight, means for measuring connected to said scanning means and said detecting means for measuring the time differential between the starting time of a reference scan angle and the time said reflected signal is received, indicating means connected to said measuring means to indicate range to said object, said scanning means comprising a laser generator, a piezoelectric optical deflector with a mirror for receiving and deflecting the laser beam, an electrical waveform generator connected to said piezoelectric optical deflector to cause it to scan said laser beam, said waveform generator including a square wave generator and a shaper connected thereto for producing a sawtooth or triangular shaped wave to drive said piezoelectric optical deflector, and a first differentiator connected to said square wave generator to differentiate its output and to pass only positive going pulses representing said starting time of the reference scan angle.

12. Apparatus for measuring range according to claim 11, wherein said waveform generator includes a square wave generator and a shaper connected to said square wave generator to produce a sawtooth or triangular shaped wave.

13. Apparatus according to claim 12 including a first differentiator connected to said square wave generator to differentiate it and to pass only the positive going pulses.

14. Apparatus according to claim 13 wherein said detecting means includes a square wave pulse shaper keyed by the reflected signal, a second differentiator connected to said pulse shaper to pass only positive going pulses, and said measuring means includes a pulse discriminator which receives the outputs of said first and second differentiators, an integrator connected to the output of said pulse discriminator, and the output of said integrator connected to said indicating means.

15. Apparatus according to claim 14 for measuring velocity further including a pulse generator connected to said pulse discriminator, and a velocity indicator connected to said integrator.

* * * * *